US012635607B2

(12) United States Patent
Clemons, Sr.

(10) Patent No.: US 12,635,607 B2
(45) Date of Patent: May 26, 2026

(54) RIDING APPARATUS FOR MOWING AND PRESSURE SURFACE CLEANING

(71) Applicant: CLEAN MOWERS, LLC, Chesapeake, VA (US)

(72) Inventor: William E Clemons, Sr., Chesapeake, VA (US)

(73) Assignee: CLEAN MOWERS, LLC, Chesapeake, VA (US)

( * ) Notice: Subject to any disclaimer, the term of this patent is extended or adjusted under 35 U.S.C. 154(b) by 0 days.

(21) Appl. No.: 18/897,869

(22) Filed: Sep. 26, 2024

(65) Prior Publication Data

US 2025/0107482 A1 Apr. 3, 2025

Related U.S. Application Data

(60) Provisional application No. 63/586,239, filed on Sep. 28, 2023.

(51) Int. Cl.
*A01D 42/06* (2006.01)
*A01D 43/14* (2006.01)
(Continued)

(52) U.S. Cl.
CPC ............. *A01D 42/06* (2013.01); *A01D 43/14* (2013.01); *A01D 34/003* (2013.01); *A01D 2101/00* (2013.01)

(58) Field of Classification Search
CPC .... A01D 43/14; A01D 34/001; A01D 34/003; A01D 42/06; B08B 3/02; B05B 3/02
See application file for complete search history.

(56) References Cited

U.S. PATENT DOCUMENTS

| | | | | | |
|---|---|---|---|---|---|
| 189,328 | A | * | 4/1877 | Stump | ................... B05B 1/3026 239/538 |
| 2,395,253 | A | * | 2/1946 | Covey | .................... A01G 25/09 239/747 |

(Continued)

FOREIGN PATENT DOCUMENTS

| | | | | |
|---|---|---|---|---|
| FR | 2515536 | A1 | * | 11/1981 |
| FR | 2677903 | A1 | * | 12/1992 |
| RU | 2201062 | C2 | * | 3/2003 ............. A01D 43/14 |

OTHER PUBLICATIONS

International Preliminary Report on Patentability dated Apr. 9, 2026 in related/corresponding PCT Application No. PCT/US2024/049150.

*Primary Examiner* — Alicia Torres
(74) *Attorney, Agent, or Firm* — PATENT PORTFOLIO BUILDERS PLLC

(57) ABSTRACT

A riding apparatus and a method for mowing and pressure surface cleaning. The riding apparatus is similar to a riding lawn mower having a chassis, body, chair, and controls. A mower deck is mounted to the chassis. A spindle mounted is mounted to the mower deck. The spindle allows connecting the mower blade, water supply, and nozzles for pressure surface cleaning. The shaft of the spindle has a vertical hole and a horizontal hole forming a T-shape path for the water supply. A swivel is coupled to the top end of the spindle and connects to a high-pressure hose. Two L-shaped pipes extend from two openings of the horizontal hole and provide attachment for the nozzles. A high-pressure pump can supply water or steam. When not used for cleaning, the nozzles and the hose from the swivel can be removed and the riding apparatus can be used for mowing.

11 Claims, 4 Drawing Sheets

(51) Int. Cl.
    *A01D 34/00*          (2006.01)
    *A01D 101/00*       (2006.01)

(56)                References Cited

U.S. PATENT DOCUMENTS

| | | | | | |
|---|---|---|---|---|---|
| 2,939,636 | A | * | 6/1960 | Mullin | A01D 43/14 56/16.8 |
| 4,106,272 | A | * | 8/1978 | Peterson | A01D 43/063 56/16.6 |
| 4,926,622 | A | * | 5/1990 | McKee | A01D 43/14 56/16.8 |
| 5,312,044 | A | * | 5/1994 | Eaton | A47L 11/4088 239/289 |
| 6,125,621 | A | * | 10/2000 | Burch | A01D 43/14 56/16.8 |
| 6,256,886 | B1 | * | 7/2001 | Legrand | A01D 34/015 30/276 |
| 7,308,900 | B2 | * | 12/2007 | Otterson | E01H 1/101 239/258 |
| 7,681,385 | B2 | * | 3/2010 | Labar | A01M 21/043 56/16.8 |
| 7,900,429 | B2 | * | 3/2011 | Labar | A01D 34/733 56/16.8 |

* cited by examiner

100

120

140

150

110

130

RIDING APPARATUS FOR MOWING AND PRESSURE SURFACE CLEANING

CROSS REFERENCE TO RELATED APPLICATIONS

This application claims priority from a U.S. Provisional Patent Application. No. 63/586,239, filed on Sep. 28, 2023, the disclosure of which is incorporated herein by reference in their entirety.

FIELD OF INVENTION

The present invention relates to a riding apparatus for mowing and pressure surface cleaning, and more particularly, the present invention relates to a riding and zero turning apparatus for mowing and cleaning using brushless surface cleaning technology and dirty water reclamation.

BACKGROUND

Lawnmowers have been an essential tool for maintaining gardens and parks. Lawnmowers have been used for decades, however, very few advancements have been made in improving the utility of the lawnmowers. Zero-turn lawnmowers are getting quite popular nowadays due to their maneuverability. Typically, a zero-turn lawnmower is built with hydrostatic transmission driven by a hydraulic pump. Each rear wheel has its own independent drive motor which allows the mower to go forward, backward, and turn in a small radius. The mower has a vertical shaft gasoline motor which provides power to the hydraulic pump and to the deck pulleys which are attached to the spindles on the deck. The spindle is made up of a solid steel shaft with multiple bearings encased in a housing that is bolted to the deck. There is a pulley on the top of the spindle and a lawn mower blade on the bottom of the spindle. Each zero-turn motor has two levers, right and left, that activate each wheel independent of each other from the driver's seat. The mower has a fuel tank, a battery, and a control panel where there is a key to start mower. The control panel has a Power take-off (PTO) button for engaging the deck pulleys. Each control panel has a throttle control for speeding up the motor and each mower has a means to raise and lower the deck. These Zero turn mowers are all built on a steel frame assembly which are painted various colors.

Zero turn mowers are costly, however, are of limited utility. A need is therefore appreciated for improvements in lawn mowers for added functions and overcoming any limited utility.

It is to be noted that phrases "pressure surface washing" and "pressure surface cleaning" are interchangeably used herein, and refers to surface cleaning using normal water, cold water hot water, and/or steam. The water may include any additives to enhance cleaning efficiency.

SUMMARY OF THE INVENTION

In one aspect, disclosed is a riding apparatus for lawn mowing and pressure surface cleaning. Disclosed is a ride on and zero-turn apparatus that may allow an end user to be able to mow grass, pressure clean hard surfaces and recover dirty water while simultaneously discharging the dirty water to a holding tank.

In one aspect, disclosed is a riding apparatus that can be used for pressure surface cleaning using hot water, normal water, and steam.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a ride-on and a zero-turn apparatus for mowing grass and pressure surface cleaning while recovering dirty water and simultaneously discharging the dirty water to a holding tank. The disclosed riding apparatus can be used for pressure surface cleaning using hot water, cold water, normal water, and/or steam. When not used for pressure surface cleaning, the disclosed riding apparatus can be used for mowing grass. Similarly, the disclosed riding apparatus can be used for pressure-cleaning hard surfaces. This greatly increases the utility of the disclosed riding apparatus making it versatile and cost effective.

Figure 1:
FIG. 1 is a perspective view of a riding apparatus for mowing grass or pressure surface cleaning with normal water, hot water, or steam, according to an exemplary embodiment of the present invention.
Figure 1:
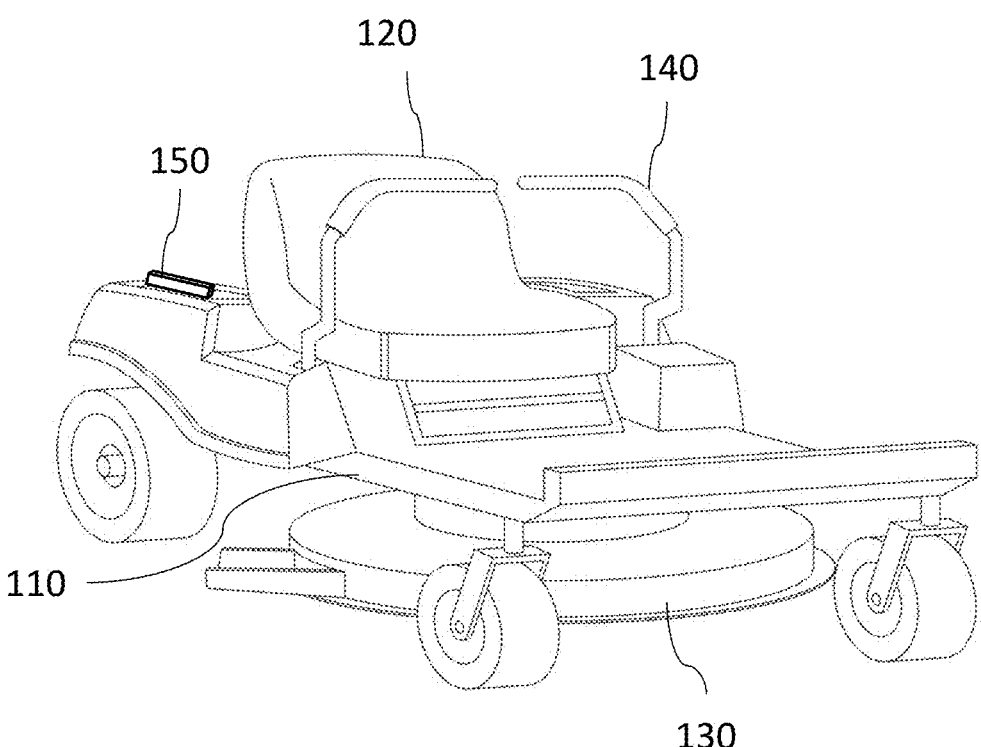

Referring to FIG. 1 shows an exemplary implementation of a riding apparatus 100 according to the present invention. The riding apparatus 100 has a chassis 110 to which a mowing deck 130 is mounted through one or more spindles. The apparatus further includes a body, a chair 120, steering levers 140, transmission, wheels, and the like components well known for use in riding mowers. Each rear wheel of the riding apparatus has its own independent drive motor that allows maneuvering the riding apparatus forward, backward, and turn in a small radius. The two steering levers 140 are for turning the ride-on apparatus in the right and left directions. The levers can activate the two wheels independently of each other. The driver while seating on the seat of the ride-on apparatus can maneuver the two levers for turning the apparatus right or left.

Instead of right and left levers, the disclosed riding apparatus may include a steering wheel, similar to the one used in cars and the like. A joystick can also be used for steering the riding apparatus. Also, more than one steering mechanism can be incorporated into the riding apparatus which can be interchangeably used. It is to be noted that any steering mechanism is within the scope of the present invention. Also, a control panel that includes different controls for operating the riding apparatus can be provided near the chair, so that it is within reach of the operator sitting on the seat and operating the riding apparatus. The control panel may include the ignition switch or a turn on & off switch. The control panel may also include a PTO button for engaging the deck pulleys to a power transmission mechanism. The control panel may also have a throttle control for speeding up the motor. The riding apparatus may also include means to raise and lower the deck, and the control for operating the same can be provided near the seat. The riding apparatus may include a hydrostatic transmission driven by a hydraulic pump. The apparatus may include a fuel tank, battery, and like components known to be used in an automobile.

The apparatus has a vertical shaft gasoline motor that powers the hydraulic pump and the deck pulleys. It is to be noted that any other means to drive the riding apparatus and the deck pulley is within the scope of the present invention. The deck pulleys are operably coupled to the spindles on the deck for rotating the mower blades.

Figure 2:
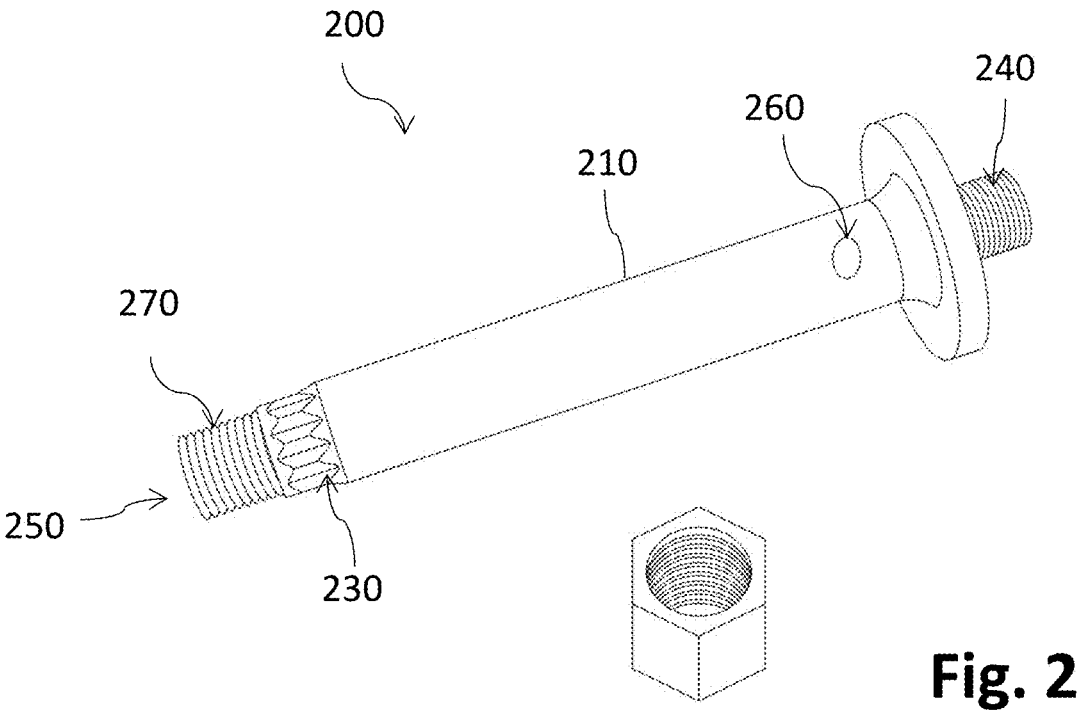
FIG. 2 illustrates a spindle shaft having a vertical hole and a horizontal hole forming an L-shape or T-shape path for water to pass through for pressure surface cleaning, according to an exemplary embodiment of the present invention.

FIG. 2 shows a spindle 200 according to the present invention. The spindle is made up of a solid steel shaft 210 with multiple bearings encased within a housing that is coupled to the deck. A deck pulley can be coupled to a top ribbed portion 230 of the shaft and secured by a threaded nut. A mower blade can be coupled to a bottom threaded portion 240 of the shaft. The spindle and the drive pulleys can transfer the motion from the power transmission mechanism to the blades for rotating the blades. It is to be understood that certain portions of the spindle, such as for mounting the blades and drive pulleys can be varied without departing from the scope of the present invention. The top ribbed portion is also referred to as a second portion that can have any structure other than the ribbed design.

Improvements according to the present invention relate to the spindle. The spindle includes a vertical hole 250 drilled in the shaft from the top end of the shaft up to a bottom portion that is just above the mower blades coupled to the spindle or above the bottom threaded portion 240. A horizontal hole 260 traverses through the shaft and the vertical hole, near the end of the vertical hole. The horizontal hole may have one opening forming a T-shape path in the shaft. Or preferably the horizontal hole completely traverses through the shaft and the vertical hole forming a T-shape path.

Figure 3:
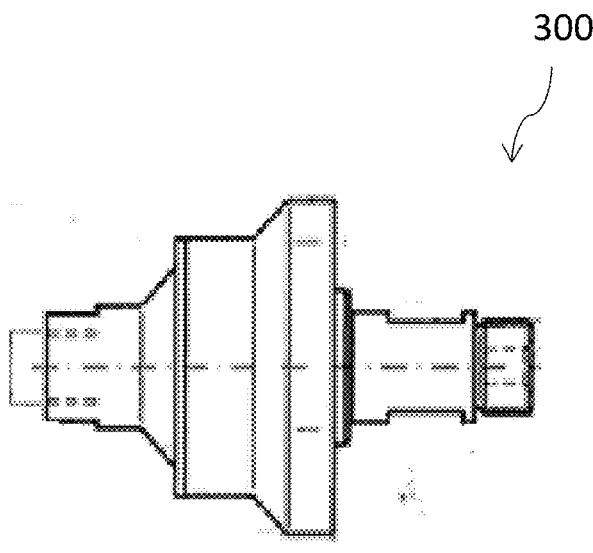
FIG. 3 shows a high-pressure swivel.

A top-end portion 270 of the shaft, above the top ribbed portion 230, can be tapped and threaded. A high-pressure swivel 300, shown in FIG. 3, can be fastened to the top end portion. First, the drive pulleys can be mounted and secured, and then the high-pressure swivel can be secured to the top end portion. The high-pressure swivel can be removably fastened to the spindle. When required, it may be easier to remove the high-pressure swivel from the spindle, i.e., the high-pressure swivel may be easily accessible for installing or removing the same. The high-pressure swivel is used for attaching a high-pressure hose so that water can pass through the hose, the high-pressure swivel, and into the spindle.

Figure 4:
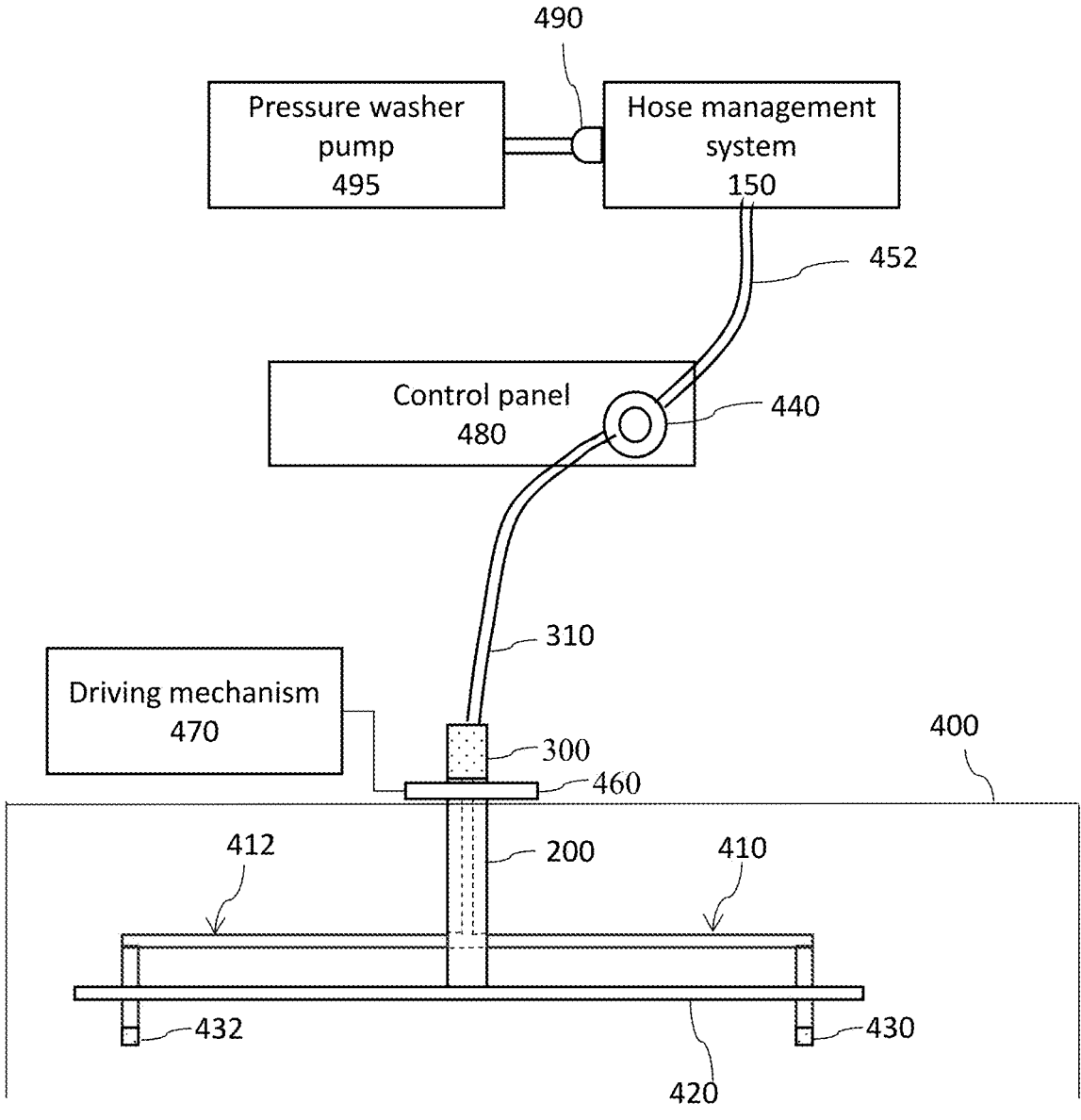
FIG. 4 is a schematic view showing the working of the apparatus having a single spindle and a single mower blade, according to an exemplary embodiment of the present invention.

Referring to FIG. 4, which is a schematic diagram shows the spindle 200 mounted to a mower deck 400. The drive pulley 460 is coupled to the top portion of the spindle 200 and the drive pulley 460 is connected to a drive mechanism 470. Such drive pulleys and the drive mechanism are known for use in riding lawnmowers and the like, and thus not explained here. The high-pressure swivel 300 is connected to the top end of the spindle 200. The high-pressure hose 310 is connected to the high-pressure swivel 300.

FIG. 4 further shows an L-shape pipe 410 extending from the spindle 200. The L-shaped pipe 410 may have a proximal end and a distal end. The long arm of the L-shaped pipe ends at the proximal end and the short arm of the L-shaped pipe ends at the distal end. The proximal end of the L-shaped pipe can be fluidly coupled to the horizontal hole in the spindle shaft. Preferably, a watertight seal can be formed connecting the L-shape pipe to the shaft. For example, the horizontal hole in the spindle shaft can be threaded and the proximal end of the L-shape pipe may have corresponding threads for fastening to the horizontal hole. The L-shaped pipe can be fluidly connected to the fluid path in the spindle shaft formed by the vertical and horizontal holes.

The length of the long arm can correspond to the length of the blade 420. When the L-shaped pipe is installed, the long arm extends up to near the tip of the blade 420 and the short arm extends downwards towards the blade 420. For example, the long arm can extend up to one inch from the tip of the blade 420. A hole can be made in the blade 420 for the distal end of the pipe to pass through. The long arm extends perpendicular to the shaft and parallel to the blade, and then the short arm extends downwards passing through the hole in the blade. The short arm may snugly fit into the hole. It is to be understood that a single pipe can be bent to form the L-shape, or two pieces of pipe can be coupled using an elbow joint. The pipe can be a quarter-inch steel pipe.

The distal end of the L-shaped pipe can also be threaded for coupling a high-pressure nozzle 430. It is understood that any means other than threads for coupling the high-pressure nozzle to the distal end of the L-shaped pipe is within the scope of the present invention.

In a case, where the horizontal hole passes through the shaft resulting in two holes, and a T-shaped path is formed, a second L-shaped pipe 412 can be coupled to the second opening of the horizontal hole in the shaft and installed similarly to the first L-shaped pipe 410. The second L-shaped pipe can be installed on another part of the blade, as shown in the drawings. Thus, the long arms of the two L-shaped pipes 410 and 412 align parallel to a longitudinal axis of the blade. A second nozzle 432 can be coupled to the distal end of the L-shaped pipe 412.

In certain implementations, the hole can be drilled in the middle of each half part of the blade. The blade is divided into two halves at the point of mounting to the shaft. Two nozzles extend downwards from the blade. High-pressure water or steam from the T-shape path can eject from the two nozzles for pressure surface cleaning. Since the blade is driven by the motor through the drive pulley, there is no need to angle the nozzles. Because the two nozzles point straight down, a significant increase in the cleaning efficiency was observed. It was found that the cleaning efficiency improved by over 50% when compared to conventional surface cleaners. It is to be noted that one or more than one nozzle is within the scope of the present invention.

The apparatus may further include a pressure washer pump 495 as a source of high-pressure water for pressure surface cleaning. For example, a minimum of 4 gallons per minute @3000 psi pressure washer pump can be used. It is to be noted that any external pressure washer pump can be used with the apparatus, and any such pressure washer pump is within the scope of the present invention. This riding apparatus can be driven by an operator for pressure surface cleaning at a higher rate of speed. Because of the novel architecture, the apparatus may use 80% less water for pressure surface cleaning compared to conventional pressure surface cleaners.

The disclosed riding apparatus has the advantage of improved cleaning, less water wastage, reducing the fatigue factor, and reducing the amount of water pollution because the nozzles are turning faster and are pointed straight down.

The riding apparatus may further include a hose management system 150. The hose management system can be coupled to the rear of the chassis of the riding apparatus. A hose from the high-pressure pump can be attached to the hose management system. The free end of the hose can include a quick connect coupler 490 for attaching to the hose management system. The structure and functioning quick-connect couplers are well known for use in surface cleaners.

The hose management system connects the hose from the high-pressure hose to another hose 452 of the hose management system 150. This hose 452 passes through a pipe that is about 2½ feet long, 1¹⁄₁₂ inches in diameter and has a 6-inch 90-degree radius bent in it. This pipe will fit in a saddle or a larger pipe that is bolted to the back of the chassis of the apparatus. The hose will attach to 5000 PSI half-in ball valve 440 via a ⅜ quick-connect nipple. The ball valve 440 can be mounted via bolts to a side of the control panel 480, so the operator has easy access to turn it on and off at his discretion. The high-pressure hose 310 can go from the discharge side of the ball valve to the high-pressure fitting on the deck swivel. This is how high-pressure water can get to high-pressure nozzles on the blades. This hose management system can swivel 180 degrees as the riding apparatus turns so that it lets the hose stay off the ground and will not allow the rear wheels to run over the hose.

Figure 5:
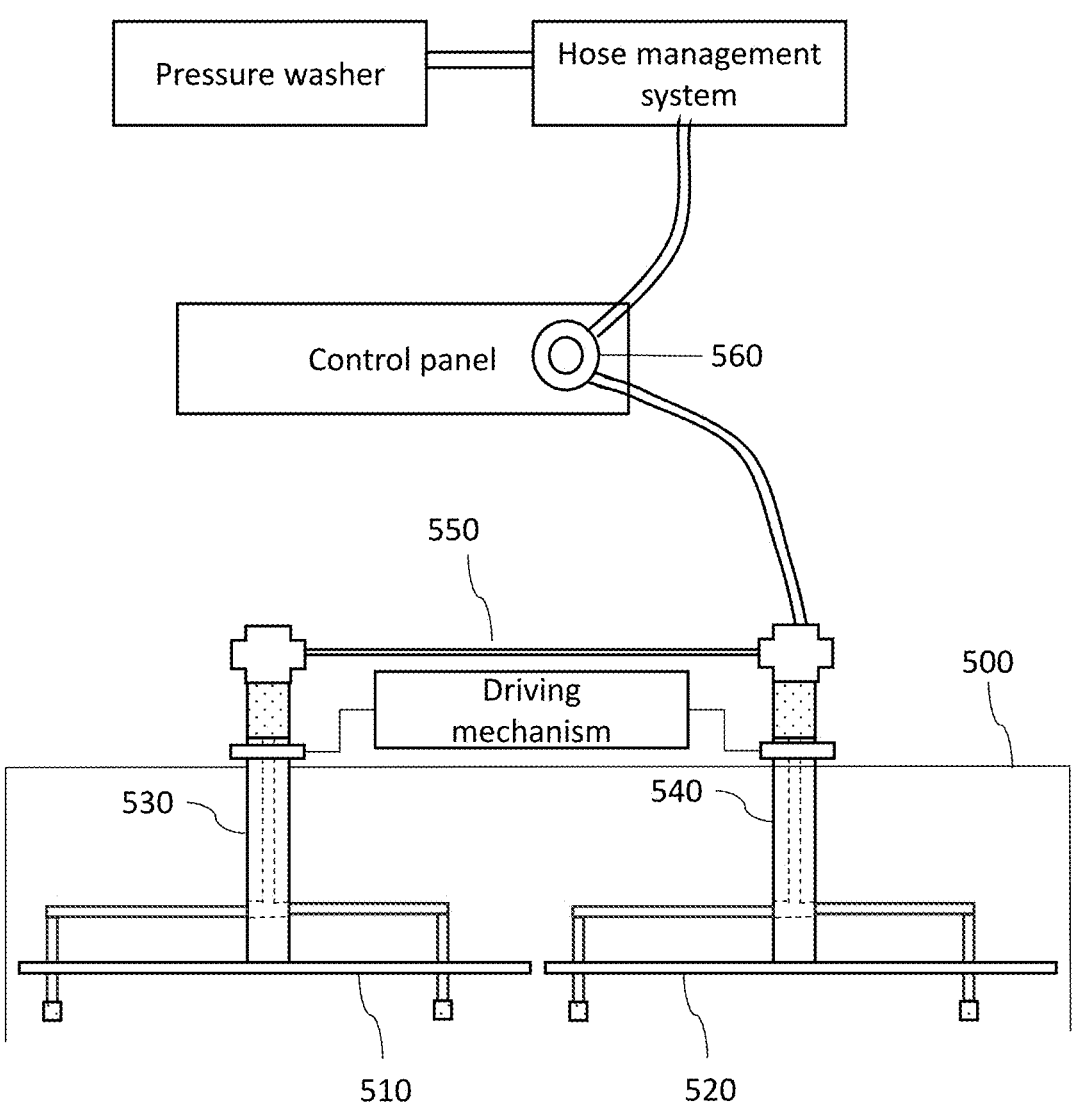
FIG. 5 is a schematic view showing the working of the apparatus having two spindles and two mower blades, according to an exemplary embodiment of the present invention.

Referring to FIG. 5 which shows another implementation of the disclosed riding apparatus. FIG. 5 shows the apparatus having two mower blades 510 and 520, mounted to two spindles 530 and 540 respectively, which are mounted to the deck 500. A high-pressure hose 550 connects to the two spindles in series to the ball valve 560. The working is similar to the apparatus shown in FIG. 4 and thus not repeated here. The use of two mower blades and thus four nozzles can speed up the process i.e., mowing or cleaning.

When the riding apparatus is not in use, or to be used for mowing grass, the nozzles on the blades can be removed and the openings can be plugged in by a cap. For example, a ¼ inch hex head can be screwed in place of the nozzles. The high-pressure swivel on top of the spindle can also be unfastened and the opening can be capped using a ¼ inch hex head plug. The hose from the pressure washer pump can also be removed from the hose management system. The quick-connect couplers allow quick and easy removal of the hose from the hose management system.

The hose management system can also be lifted out of its saddle. This will allow operators to freely mow grass until the operator needs to clean hard flat surfaces. This process of transforming from mower to drivable surface cleaner with a hose management system requires two wrenches, a 1⅜ inch boxed-in wrench, and one ⁹⁄₁₆-inch opened end wrench, and takes only a few minutes to retrofit.

The riding apparatus may also include an additional power take-off (PTO). A higher horsepower motor can also be used to support the mower functions as well as power a generator 220-110 V- and 20-amp service. The generator can allow adding multiple additional features to the riding apparatus. For example, a specially designed electric vacuum system with a squeegee can be towed behind a riding apparatus which can pick up water, dirt, oils, etc., while cleaning, and can pump them out to a holding tank simultaneously. This vacuum system can retrieve 95% of the liquids preventing them from going down the storm sewer, thus preventing pollution. An electric edger for edging a yard can also be added. An electric weedwhacker and an electric blower can also be added.

Typically, in a gasoline vertical shaft powered mower, a fan is mounted on the top of the armature of the motor, which is held in place by a bolt screwed into the top of the crankshaft of the motor. Improvements are made by extending the crank, for example, by adding a 1-inch keyed steel shaft approximately 9 to 10 inches long. On one end can be a machine to match the bolt that holds the fan in place on top of the crankshaft so this shaft can be screwed onto the top of the crank. This will allow one to place a pulley that has blades in it, so when the motor is running, it will suck outside air and force it into the fan on the motor so as not to impede airflow. This pulley will allow for powering a generator via a belt drive system (clutch generator to turn on/off) giving 220 V 20-amp service and two 120-volt outlets.

The invention is advantageous in that the cleaning efficiency is improved by 50% because of the nozzle's orientation. Water consumption and thus pollution can be significantly reduced. The laborious task of pressure surface cleaning can be made easy and quick, significantly eliminating the fatigue factor from pushing the machine and dragging a high-pressure hose. The operator remains at a good distance from the area being cleaned and thus does not get wet. The vacuumed water is discharged to the holding tank in near real-time, and this water can be recycled.

Noise is significantly reduced in comparison to a twenty-five-horsepower gasoline-operated vacuum blower with hundreds of feet of vac hose and vac hose reels and huge trailers and trucks for transporting heavy equipment. A single operator can operate the disclosed riding apparatus, thus saving labor costs. The riding apparatus can include additional features like an electric edger that can be operated from the driver's seat, a weed whacker that can be used from the driver's seat, blowers that can be used from the driver's seat, and many more features that can be added.

It is to be noted that the disclosed riding apparatus can be used for surface cleaning using cold water, hot water, and steam, and thus any reference to liquid, water, or steam for surface cleaning, using the disclosed riding apparatus, refers to the use of cold water, hot water, or steam.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A riding apparatus for mowing and pressure surface cleaning with recovery of dirty water, the riding apparatus comprising:

a chassis;

a mower deck mounted to the chassis;

a spindle mounted to the mower deck, the spindle comprising an elongated shaft having a top end and a bottom end;

a mower blade mounted to the bottom end of the elongated shaft and rotatable about a vertical axis;

wherein the mower blade includes at least one blade-formed aperture extending through a thickness of the mower blade at a location radially offset from the vertical axis;

a rigid fluid conduit extending through the elongated shaft and terminating at a distal end that passes through the blade-formed aperture such that the distal end rotates together with the mower blade;

a nozzle fixedly coupled to the distal end of the rigid fluid conduit and positioned below the mower blade, the nozzle being oriented to eject pressurized water downwardly toward a surface beneath the mower deck while rotating with the mower blade;

a high-pressure pump in fluid communication with the rigid fluid conduit, wherein the high-pressure pump is configured to pressurize water for pressure surface cleaning; and wherein the nozzle is removable from the blade-formed aperture to permit operation of the riding apparatus in a mowing-only mode.

2. The riding apparatus of claim 1, further comprising a plurality of wheels operatively coupled to a drive system configured to provide riding movement and zero-turn maneuvering.

3. The riding apparatus of claim 1, wherein the elongated shaft comprises a sealed internal fluid passage including:

a vertical passage extending along a longitudinal axis of the elongated shaft; and a transverse passage intersecting the vertical passage near the bottom end of the elongated shaft.

4. The riding apparatus of claim 3, further comprising a high-pressure swivel removably mounted to the top end of the elongated shaft and configured to supply pressurized fluid into the sealed internal fluid passage while the elongated shaft rotates.

5. The riding apparatus of claim 4, wherein the nozzle is fluidly coupled to the transverse passage through the rigid fluid conduit.

6. The riding apparatus of claim 1, wherein the riding apparatus is selectively convertible between:

a mowing mode in which the mower blade cuts vegetation; and a pressure surface cleaning mode in which the rotating mower blade drives the high-pressure nozzle to clean a hard surface.

7. The riding apparatus of claim 1, wherein the high-pressure pump delivers fluid at a pressure of at least 3000 psi, and the pressure-cleaning nozzle is configured to operate at pressures of at least 3000 psi.

8. The riding apparatus of claim 1, wherein the high-pressure pump is configured to pressurize steam for pressure surface cleaning.

9. The riding apparatus of claim 1, further comprising a hose management system mounted to a rear portion of the chassis and configured to supply pressurized fluid from the high-pressure pump to the elongated shaft, wherein the hose management system is configured to swivel relative to the chassis during zero-turn operation to prevent hose entanglement with wheels.

10. The riding apparatus of claim 1, wherein the nozzle is oriented substantially perpendicular to the surface beneath the mower deck to increase contaminant removal efficiency.

11. The riding apparatus of claim 1, further comprising a vacuum recovery unit configured to collect used cleaning fluid from the surface.

* * * * *